United States Patent
Van Der Burg et al.

(10) Patent No.: US 9,901,877 B2
(45) Date of Patent: Feb. 27, 2018

(54) SPIRAL WOUND GAS SEPARATION MEMBRANE MODULE

(71) Applicants: Fujifilm Manufacturing Europe B.V., Tilburg (NL); Fujifilm Corporation, Tokyo (JP)

(72) Inventors: Eduard Van Der Burg, Tilburg (NL); Nori Miyagishima, Tilburg (NL); Yujiro Itami, Tilburg (NL)

(73) Assignees: Fujifilm Manufacturing Europe B.V. (NL); Fujifilm Corporation (JP)

( * ) Notice: Subject to any disclaimer, the term of this patent is extended or adjusted under 35 U.S.C. 154(b) by 36 days.

(21) Appl. No.: 15/026,976

(22) PCT Filed: Sep. 30, 2014

(86) PCT No.: PCT/GB2014/052942
§ 371 (c)(1),
(2) Date: Apr. 3, 2016

(87) PCT Pub. No.: WO2015/049499
PCT Pub. Date: Apr. 9, 2015

(65) Prior Publication Data
US 2016/0256828 A1    Sep. 8, 2016

(30) Foreign Application Priority Data

Oct. 3, 2013    (GB) .................................. 1317519.5

(51) Int. Cl.
*B01D 53/22*    (2006.01)
*B01D 63/10*    (2006.01)
(Continued)

(52) U.S. Cl.
CPC .......... *B01D 63/103* (2013.01); *B01D 53/22* (2013.01); *B01D 53/228* (2013.01); *B01D 71/64* (2013.01);
(Continued)

(58) Field of Classification Search
CPC .. B01D 19/0031; B01D 53/22; B01D 53/228; B01D 63/08; B01D 63/082; B01D 63/10;
(Continued)

(56) References Cited

U.S. PATENT DOCUMENTS 3,872,014 A   3/1975  Schell
3,899,309 A   8/1975  Hoehn et al.
(Continued)

FOREIGN PATENT DOCUMENTS

EP    1059114 A2    12/2000
WO   03101575 A2    12/2003
(Continued)

OTHER PUBLICATIONS

International Search Report and Written Opinion issued in corresponding International Application No. PCT/GB2014/052942, dated Dec. 15, 2014.
(Continued)

*Primary Examiner* — Jason M Greene
(74) *Attorney, Agent, or Firm* — Banner & Witcoff, Ltd.

(57) ABSTRACT

A gas separation module comprising one or more gas separation elements, said elements comprising at least two membrane sheets and a permeate carrier sandwiched between the membrane sheets, wherein the contact area of the membrane sheets with the permeate carrier is less than 50%.

18 Claims, 2 Drawing Sheets

(51) Int. Cl.
B01D 71/64 (2006.01)
B01D 65/10 (2006.01)
(52) U.S. Cl.
CPC ........ B01D 65/10 (2013.01); B01D 2313/143 (2013.01); B01D 2313/146 (2013.01)
(58) Field of Classification Search
CPC . B01D 63/103; B01D 71/64; B01D 2313/146
See application file for complete search history.

(56) References Cited

U.S. PATENT DOCUMENTS

| | | | |
|---|---|---|---|
| 4,717,394 A | 1/1988 | Hayes | |
| 4,735,717 A | 4/1988 | Sims | |
| 4,802,982 A * | 2/1989 | Lien | B01D 63/10 210/247 |
| 5,085,676 A | 2/1992 | Ekiner et al. | |
| 5,275,726 A | 1/1994 | Feimer et al. | |
| 5,538,642 A * | 7/1996 | Solie | B01D 63/10 210/321.83 |
| 6,454,942 B1 | 9/2002 | Shintani et al. | |
| 2004/0226886 A1* | 11/2004 | Hester | B01D 63/08 210/649 |
| 2005/0173333 A1 | 8/2005 | Kloos et al. | |
| 2011/0303559 A1 | 12/2011 | Michel | |
| 2012/0261333 A1 | 10/2012 | Moran et al. | |
| 2012/0328844 A1* | 12/2012 | Zounek | B01D 63/08 428/174 |
| 2013/0098829 A1 | 4/2013 | Dontula et al. | |
| 2013/0101797 A1 | 4/2013 | Dontula et al. | |
| 2015/0343388 A1* | 12/2015 | Hester | B01D 63/082 210/322 |
| 2016/0008763 A1* | 1/2016 | Roderick | B01D 63/10 210/650 |

FOREIGN PATENT DOCUMENTS

| | | | |
|---|---|---|---|
| WO | 2006/044711 A1 | 4/2006 | |
| WO | WO 2006044711 A1 * | 4/2006 | ............ B01D 69/10 |
| WO | 2009125218 A1 | 10/2009 | |

OTHER PUBLICATIONS

International Preliminary Report on Patentability issued in corresponding International Application No. PCT/GB2014/052942, dated Apr. 5, 2016.
Koutsou et al., "Characteristics of permeate-side spacers of spiral wound membrane modules", Desalination, 322, 131-136, 2013.
Lohokare et al., "Effect of Support Material on Ultrafiltration Membrane Performance", Journal of Applied Polymer Science, vol. 99, 3389-3395, 2006.

* cited by examiner

SPIRAL WOUND GAS SEPARATION MEMBRANE MODULE

RELATED APPLICATION DATA

This application is a National Stage Application under 35 U.S.C. 371 of co-pending PCT application number PCT/GB2014/052942 designating the United States and filed Sep. 30, 2014; which claims the benefit of GB application number 1317519.5 and filed Oct. 3, 2013 each of which are hereby incorporated by reference in their entireties.

This invention relates to gas separation modules and to their use.

Gas separation modules typically comprise one or more gas separation elements, wherein each element comprises at least two membrane sheets and a permeate carrier sandwiched between said membrane sheets. The permeate carrier is usually a smooth, gas permeable material which contacts the membranes across all or most of their surfaces, such that the contact area of the membrane sheets with the permeate carrier is very high (in many cases approaching 100%). The membrane sheets typically comprise a polymeric discriminating layer and a porous support.

Often the gas separation elements are separated from each other by feed spacer screens, which are of a relatively large mesh size to accommodate feed gas flow. Typically a stack of alternating gas separation elements and feed spacers are wound spirally onto a perforated permeate collection tube which collects gas which has permeated into the gas separation element.

In spiral gas separation modules, the outside edges of the gas separation elements are generally sealed on all but one side, allowing access to the permeate carrier only from a radial direction through the membrane. The gas separation elements are placed with the unsealed edge adjacent to a perforated permeate collection tube and oriented along the length of the tube, allowing the permeate to flow into the permeate collection tube.

After the gas separation elements are wound onto a permeate collection tube, some type of external restraining means such as a hard shell, straps, anti-telescoping device or a bypass screen, or a combination thereof, may be used to hold the spiral wound gas separation elements in tight formation around the tube. The spiral module is then loaded into a pipe-like housing or pressure vessel which is operated at a slight pressure drop across the module as the gas being filtered flows through.

The present inventors have found that the modules having good flux and selectivity may be obtained by reducing the contact area of the membrane sheets with the permeate carrier as described below.

According to a first aspect of the present invention there is provided a gas separation module comprising one or more gas separation elements, said elements comprising at least two membrane sheets and a permeate carrier sandwiched between the membrane sheets, wherein the contact area of the membrane sheets with the permeate carrier is less than 50%.

The term "comprising" is to be interpreted as specifying the presence of the stated parts, steps or components, but does not exclude the presence of one or more additional parts, steps or components.

Reference to an item by the indefinite article "a" or "an" does not exclude the possibility that more than one of the item(s) is present, unless the context clearly requires that there be one and only one of the items. The indefinite article "a" or "an" thus usually means "at least one".

The contact area of said membrane sheets with the permeate carrier is preferably <45%. The contact area of said membrane sheets with the permeate carrier is preferably >5%, more preferably >10%, especially >20%. The contact area of each membrane sheet with the permeate carrier may be determined by forming a membrane sheet—permeate carrier laminate using a laminator, peeling off the membrane sheets and determining the contact area by performing measurements using a microscope. The contact area can be seen as an impression on the membrane sheet (see FIG. 1 and FIG. 2. and the discussion the discussion of these figures below). A suitable laminator is the Ibico PL-330LSI. Typically the laminator operates at 80° C. A suitable microscope for performing the contact surface area measurements is the Nikon SZM800, using CellSens Dimension 1.6 digital imaging software to analyse images obtained using the microscope. In some cases, e.g. when the membrane is temperature-sensitive, it is convenient to place the permeate carrier inside a lamination pouch made from a mixture of a polyester and EVA (ethylene vinyl acetate) (instead of placing the permeate carrier between two membranes) and to obtain the contact area using that pouch instead.

Preferably at least 50%, more preferably at least 75%, especially 100% of the gas separation elements present in the module comprise at least two membrane sheets and a permeate carrier sandwiched between the membrane sheets, wherein the contact area of the membrane sheets with the permeate carrier is as stated above (e.g. less than 50%).

In one embodiment, the (cross sectional) area of the membrane sheet and permeate carrier are identical, for example the length and width of the membrane sheet and permeate carrier are identical. In another embodiment, the area of the membrane sheet and permeate carrier are not identical, for example when the length and/or width of the permeate carrier is smaller than length and/or width of the membrane sheets. When the area of the membrane sheet and permeate carrier are not identical, the contact area is calculated relative to the area of the permeate carrier. For example, the area of rectangular permeate carrier is its length×width and the % contact area is calculated relative to the area of the permeate carrier (length×width).

BRIEF DESCRIPTION OF THE DRAWINGS

In the accompanying drawings:

FIG. 1 is a photograph of a polyester/EVA sheet which has been laminated in contact with the course side of macroporous sheet HW 2503 which can be used as a permeate carrier, as mentioned in Table 5 below. One can clearly see the contact areas (2) as the impression embedded into the polyester/EVA sheet. The smooth, non-contact areas (1) can also be seen. In this case the contact area was 42.4%.

FIG. 2 is a photograph of a polyester/EVA sheet which has been laminated in contact with the wales side of macroporous sheet HW 2503. One can clearly see the contact areas (2) as the impression embedded into the polyester/EVA sheet. The smooth, non-contact area (1) can also be seen. In addition, there was a fine diamond-pattern (4) arising from netting between the polyester/EVA sheet and the permeate carrier which further reduced the contact area slightly. In this case the contact area was 54.2% (i.e. outside of claim 1).

Referring to FIG. 3, a gas separation module according to the present invention is designated generally by the numeral (10). The module has a central permeate collection tube (16) having perforations (22) along its length. The module includes gas separation elements (12) wound around the permeate collection tube. The gas separation element (12) includes membrane sheets (18) and a permeate carrier (20) sandwiched between the membrane sheets (18). The contact area between the membrane sheets (18) and a permeate carrier (20) is selecting one or the other to have a surface profile which reduces the contact area to below 50% (e.g. by using a highly textured permeate carrier (20)) (not shown). Each gas separation element is oriented to present an edge generally adjacent the tube (16), a pair of side edges and an axial edge distal from the tube and oriented to be in parallel with the axis of the tube. A liquid adhesive (not shown) is applied between the membrane sheets (18) along three sides and in a location near the axial and side edges of the element that corresponds to the desired location for a gas-tight seam, i.e. the periphery. The fourth, open edge of the gas separation element (12) is fixed onto the permeate collection tube (16) so that gas which has permeated into the gas separation element can flow through perforations (22) and into the permeate collection tube (16). The edges between adjacent gas separation elements (12) which lie along the axial length of permeate collection tube (16) are sealed or folded on the edge which contacts the permeate collection tube (16) so that feed gas can flow through the optional feed spacer screens (14) between the gas separation elements but cannot enter the permeate collection tube (16) without first passing through the membrane sheets (18) and into the permeate carrier (20).

Figure 1:
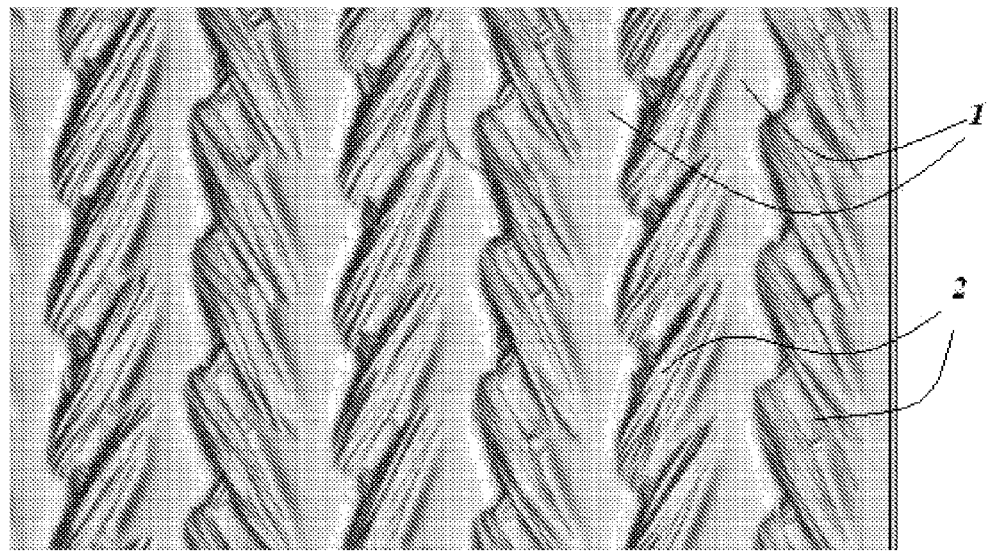
FIG. 1 is a photograph showing a contact area of less than 50%.
Figure 2:
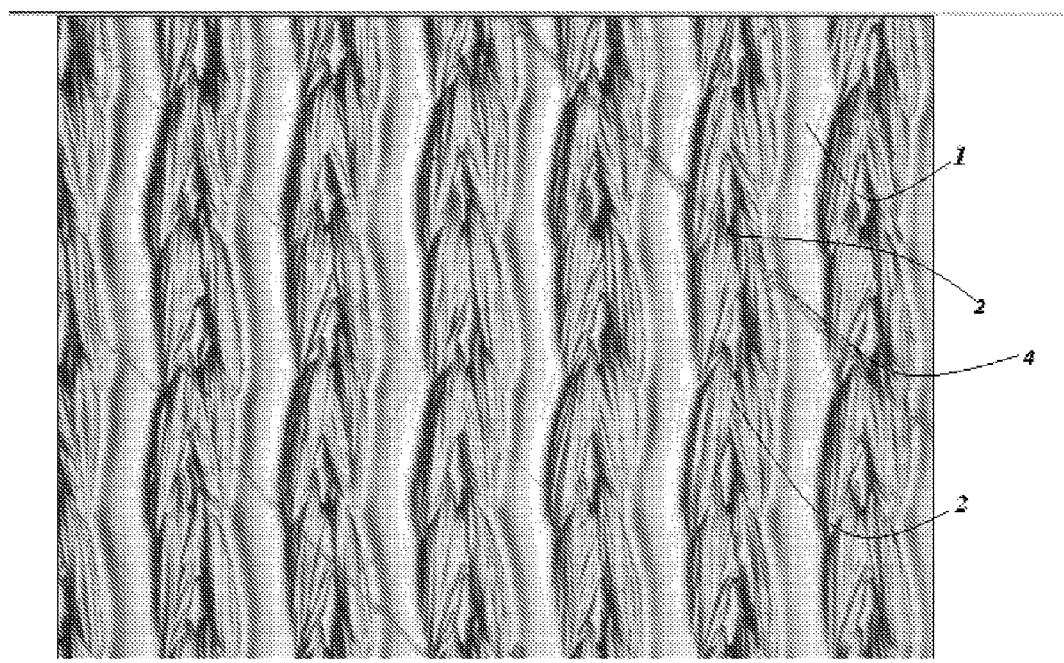
FIG. 2 is a photograph showing a contact area of more than 50%.
Figure 3:
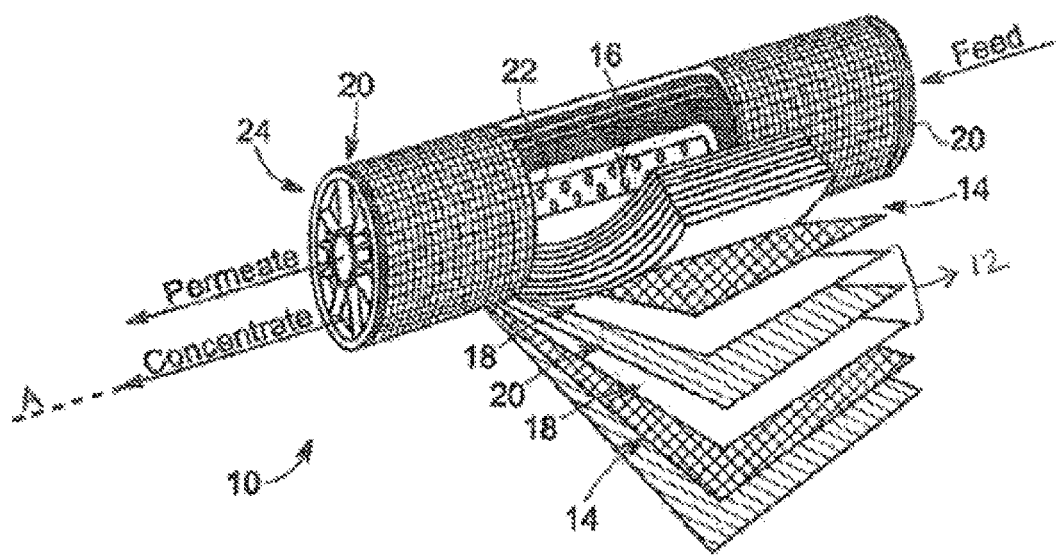
FIG. 3 is a partially exploded, perspective view of a gas separation module of the present invention.

Permeate carrier (20), membrane sheets (18), and feed spacer screens (14) are thus spirally wound around permeate collection tube (16) with permeate carrier (20) located adjacent to tube (16) and in gas communication therewith. Typically a plurality of gas separation elements (12), each comprising at least two membrane sheets (18) and a permeate carrier (20) sandwiched between the membrane sheets (20) are spirally wound about permeate tube (16) with a feed spacer screen (14) located between each gas separation element (12). The module may optionally be formed without feed spacer screen (14).

The permeate carrier preferably has an average thickness of 150 to 800 µm, preferably 200 to 500 µm, especially 250 to 400 µm.

The desired contact area may be achieved by using membrane sheets and/or permeate carriers having a surface profile which causes the desired contact area. For example, one may use highly textured membrane sheets or, more typically, highly textured permeate carriers whereby the texture results in a low contact area between the membranes and the permeate carrier. The surface profile(s) can be used to keep >50% of the surface of the facing membrane sheets and permeate carriers apart, while at the same time ensuring there is some contact between the membrane sheets and permeate carriers, albeit a contact area <50%.

The permeate carrier preferably comprises a macroporous sheet (e.g. a sheet having pores of average size >30 µm. The macroporous sheets typically have very high gas permeability. The macroporous sheets are not included to discriminate between gases but instead to provide a pathway for the permeate gases to flow through. Suitable macroporous sheets include woven fabric, non-woven fabric, especially knitted fabric, more especially a warp knitted fabric or a weft knitted fabric. Knitted fabrics typically comprise a plurality of consecutive rows of loops called 'stitches'. As each row progresses, a new loop is pulled through an existing loop. The active stitches are held on a needle until another loop can be passed through them. This process eventually results in a knitted fabric. Knitting may be done by hand or more typically by machine.

Suitable weft knitted fabrics can be made from one yarn, although more than one yarn can be used to achieve particular patterns and surface profiles in the fabric and create a surface texture which gives rise to the desired contact area. The yarn is typically inserted in a horizontal or weft direction, hence the classification as weft knitted.

Rows of stitches in knitted fabrics are called 'courses' and columns of stitches are called 'wales'.

Warp knitted fabrics are also composed of loops arranged in wales and courses. The yarn is typically inserted in the vertical or warp direction, hence the classification as warp knitted. They require at least one warp yarn to supply each needle on a knitting machine manufacturing the warp knitted fabric. They are normally made with 2 or more sets of warp yarns. Their properties normally lie between those of woven and weft knitted fabrics.

A particularly preferred warp knitted fabric is tricot. In tricot fabrics the yarn typically zigzags vertically along columns of knit resulting in a series of wales (ribs) on one side and on the other (back) side is the course side where the courses are in series parallel to the orientation of the wales. The orientation in the present invention as such is not limited as long as the side facing the membrane has a contact area of less than 50%.

The permeate carrier optionally has a different surface profile on each side. For example, one side may comprise mostly 'courses' (referred to as the course side) and the other side may comprise mostly 'wales' (referred to as the wales side). When the permeate carrier has one side which would result in a contact area of less than 50% (e.g. the course side) and another side which would result in a contact area of 50% or more (e.g. the wales side), one will orientate the permeate carrier such that the side which would result in a contact area of less than 50% is in contact with the membrane (e.g. the course side).

The permeate carrier optionally comprises two or more macroporous sheets (e.g. fabrics), which may be the same or different. For example, where one side of the macroporous sheet is rough and the other relatively smooth, one may orientate two sheets of the macroporous sheet 'back to back' with the relatively smooth faces in contact with each other such that the relatively rough faces contact the membranes and achieve the desired contact area. As macroporous sheet one may also use, for example, the materials mentioned below as being suitable for making the porous support for the composite membrane.

One may choose macroporous sheets having an uneven surface profile in order to ensure that the desired contact area between the permeate carrier and the membrane(s) is kept below 50%.

The permeate carrier is optionally made from a natural fibre or a man-made fibre, e.g. polyester, polysulfone, polyester, nylon, teflon, polypropylene, polyphenylenesulfide, etc. The fibres are optionally resin coated, e.g. with a resin such as an epoxy or melamine resin.

The permeate carrier preferably comprises at least two macroporous layers and a gas impermeable sheet (sometimes called an interfoil) located between the two macroporous layers. The presence of such a gas impermeable sheet can improve selectivity, gas flux and also reduce compaction of the gas separation element arising from the high pressures experienced by the module. Suitable gas impermeable sheets preferably have a thickness of <0.1 cm, more preferably <0.07 cm.

The macroporous layers may be provided by one or more macroporous sheets. In one embodiment the macroporous layers are provided by two or more macroporous sheets. For example, the permeate carrier comprises at least two macroporous sheets and a gas impermeable sheet located between the macroporous sheets, preferably being coextensive therewith. In an alternative embodiment, the macroporous layers are provided by one macroporous sheet folded around the gas impermeable sheet. For example, the permeate carrier comprises one macroporous sheet and a gas impermeable sheet of half the cross sectional area of the macroporous sheet and the macroporous sheet is folded around the gas impermeable sheet, preferably such that the macroporous sheet and the gas impermeable sheet are substantially coextensive.

Preferably the gas separation module is a spiral wound gas separation module. For example, the gas separation further comprises a perforated permeate collection tube and the one or more gas separation elements are wound around that tube and are in gas communication therewith.

The function of the permeate collection tube, when present, is to collect the permeate gas which has passed through the membranes. Thus the elements are arranged such that the permeate can flow through the permeate collection tube perforations and the retentate cannot flow through the permeate collection tube perforations.

The openings along the length of the permeate collection tube allow gas flow from the exterior of tube to the interior. Surrounding the permeate tube and in gas communication therewith is a permeate carrier. The permeate carrier typically transports the filtered permeate in a direction perpendicular to the axial length of the tube.

The permeate collection tube is typically constructed of a rigid material, for example a metal (e.g. stainless steel) or a plastic.

Typically the membrane sheets are composite membranes, e.g. comprising a discriminating layer and a porous support. The function of the discriminating layer is to preferentially discriminate between gases, separating a feed gas mixture into a permeate which passes through the membrane and a retentate which does not pass through the membrane. The permeate and retentate typically comprise the same gases as the feed gas mixture, but one is enriched in at least one of the gases present in the feed gas and the other is depleted in that same gas.

The porous support is typically open pored, relative to the discriminating layer. The porous support may be, for example, a microporous organic or inorganic membrane, or a woven or non-woven fabric. The porous support may be constructed from any suitable material. Examples of such materials include polysulfones, polyethersulfones, polyimides, polyetherimides, polyamides, polyamideimides, polyacrylonitrile, polycarbonates, polyesters, polyacrylates, cellulose acetate, polyethylene, polypropylene, polyvinylidenefluoride, polytetrafluoroethylene, poly(4-methyl 1-pentene) and especially polyacrylonitrile.

One may use, for example, a commercially available, porous sheet material as the support for the composite membrane. Alternatively one may prepare the porous support using techniques generally known in the art for the preparation of microporous materials. In one embodiment one may prepare a porous, non-discriminatory support by curing curable components, then applying further curable components to the formed porous support and curing such components thereby forming the layer of cured polymer and the discriminating layer on the already cured porous support. One may also use a porous support which has been subjected to a corona discharge treatment, glow discharge treatment, flame treatment, ultraviolet light irradiation treatment or the like, e.g. for the purpose of improving its wettability and/or adhesiveness.

The porous support preferably used to form the membrane preferably has an average pore size of at least about 50% greater than the average pore size of the discriminating layer, more preferably at least about 100% greater, especially at least about 200% greater, particularly at least about 1000% greater than the average pore size of the discriminating layer.

The pores passing through the porous support typically have an average diameter of 0.001 to 10 μm, preferably 0.01 to 1 μm (i.e. before the porous support has been converted into a composite membrane). The pores at the surface of the porous support will typically have a diameter of 0.001 to 0.1 μm, preferably 0.005 to 0.05 μm. The pore diameter may be determined by, for example, viewing the surface of the porous support by scanning electron microscopy ("SEM") or by cutting through the support and measuring the diameter of the pores within the porous support, again by SEM. The porous support preferably has an average thickness of 20 to 500 μm, preferably 50 to 400 μm, especially 100 to 300 μm.

One may use an ultrafiltration membrane as the porous support, e.g. a polysulfone ultrafiltration membrane, cellulosic ultrafiltration membrane, polytetrafluoroethylene ultrafiltration membrane, polyvinylidenefluoride ultrafiltration membrane and especially polyacrylonitrile ultrafiltration membrane. Asymmetric ultrafiltration membranes may be used, including those comprising a porous polymer membrane (preferably of thickness 10 to 150 μm, more preferably 20 to 100 μm) and optionally a woven or non-woven fabric support. The porous support is preferably as thin as possible, provided it retains the desired structural strength.

Typically the discriminating layer is present on one side of the porous support or is partially or wholly within the porous support.

Preferred discriminating layers comprise a polyimide, especially a polyimide having —$CF_3$ groups. Polyimides comprising —$CF_3$ groups may be prepared by, for example, the general methods described in U.S. Pat. Reissue No. 30,351 (based on U.S. Pat. No. 3,899,309) U.S. Pat. No. 4,717,394 and U.S. Pat. No. 5,085,676. Typically one or more aromatic dianhydrides, preferably having —$CF_3$ groups, are condensed with one or more diamines. The diamine(s) and dianhydride(s) copolymerise to form an AB-type copolymer having alternating groups derived from the diamine(s) and dianhydride(s) respectively.

Preferably the discriminating layer comprises groups of the Formula (1) wherein Ar is an aromatic group and R is a carboxylic acid group, a sulphonic acid group, a hydroxyl group, a thiol group, an epoxy group or an oxetane group:

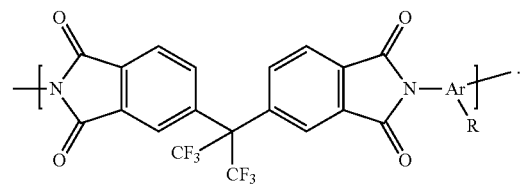

Formula (1)

Optionally the membranes further comprise a polymeric layer between the porous support and the discriminating layer, often referred to as a gutter layer. Preferred gutter layers comprise a dialkylsiloxane.

Preferably the module further comprises a feed spacer screen, located between the separation elements. The feed spacer screen typically has a relatively large mesh size to allow the feed gas to travel axially along membrane module (in the case of a spiral gas module). In most instances, the feed spacer screen will be utilized, but it is possible to construct a module without this component. In general, a feed spacer screen is formed of any inert material which maintains a space between the gas separation elements and is stable to the feed gas. Further, the feed spacer screen allows the gas to be filtered to travel axially along the membrane module.

Preferred materials for the feed spacer screen are open, channel forming grid materials, such as polymeric grid, or corrugated or mesh materials. Preferred among these are polypropylene or other polyolefin netting materials.

Typically the edges of adjacent membrane sheets which lie along the axial length of permeate tube are sealed so that gas flowing through feed spacer screen is prevented from direct access to permeate tube. Alternatively, the membrane sheet may be folded with the fold being adjacent to the permeate tube and with feed spacer screen located within the fold such that membrane surfaces face one another.

The permeate carrier, the membrane sheets, and feed spacer screen(s) (when present) may thus be spiral wound around a permeate collection tube with the permeate carrier in gas communication with the permeate collection tube. Referring to the series of layers of membrane sheet, permeate carrier and a second membrane sheet as a gas separation element, typically a plurality of gas separation elements are spiral wound about the permeate tube with a feed spacer screen located between each element.

Preferably at least one of the gas separation elements reduces in thickness by <25%, more preferably <23%, when it is subjected to a pressure of 7 million Pascal for 5 hours.

After the membrane module has been wound, the assembly may be held in a wound state through the use of restraining bands or outer wraps, or a combination thereof. A preferred method of restraining the assembly is by filament winding, in which a glass fibre filament dipped in an adhesive is wound around the assembly and cured. The modules can then be loaded into a housing or pressure vessel which is preferably operated at a slight pressure drop across the module as the gas being filtered flows through. In operation, the feed gas to be filtered is introduced at one end face of the membrane module.

In a spiral wound gas separation module, the feed gas travels axially along membrane module through the feed spacer screen. As the feed gas encounters the external surface of a gas separation element, part of the feed gas (the permeate) passes through membrane in a direction perpendicular to the axis of tube. After the permeate passes through the membrane, it travels along the permeate carrier, eventually passing into permeate tube through the perforations. The permeate exits the membrane module through the permeate tube and the retentate travels axially through the module along feed spacer screen.

As will be appreciated, in a spiral wound gas separation module it is necessary to seal all of the edges of membrane sheets, with the exception of the edge adjacent to the permeate tube, in order to prevent the feed gas from entering the permeate carrier without first passing through the membrane. Thus it is necessary to prevent the feed gas from entering permeate carrier without first being filtered as desired. In the method of preparing the module according to the present invention, an adhesive may be applied to at least a part of the periphery of the membrane sheets, e.g. to the side edges and axial edges Preferably the membranes have a $CO_2/CH_4$ selectivity ($\alpha CO_2/CH_4$)>10. Preferably the selectivity is determined by a process comprising exposing the membrane to a 13/87 mixture by volume of $CO_2$ and $CH_4$ at a feed pressure of 6000 kPa at 40° C.

While this specification emphasises the usefulness of the modules prepared by the method of the present invention for separating gases (which includes vapours), especially polar and non-polar gases, it will be understood that the modules can also be used for other purposes, for example providing a reducing gas for the direct reduction of iron ore in the steel production industry, dehydration of organic solvents (e.g. ethanol dehydration), pervaporation, oxygen enrichment, solvent resistant nanofiltration and vapour separation.

According to a second aspect of the present invention there is provided a process for separating and/or purifying a feed gas comprising at least two different gaseous components comprising passing the feed gas through a module according to the first aspect of the present invention such that feed gas is separated into a permeate gas and a retentate gas, one of which is enriched in at least one of the said gaseous components and one of which is depleted in at least one of the said gaseous components.

The modules prepared according to the invention are particularly useful for the separation of a feed gas (which includes a feed vapour) containing a target gas into a gas stream rich in the target gas and a gas stream depleted in the target gas. For example, a feed gas comprising polar and non-polar gases may be separated into a gas stream rich in polar gases and a gas stream depleted in polar gases. In many cases the membranes have a high permeability to polar gases, e.g. $CO_2$, $H_2S$, $NH_3$, $SO_x$, and nitrogen oxides, especially $NO_x$, relative to non-polar gases, e.g. alkanes, $H_2$, $N_2$, and water vapour. The target gas may be, for example, a gas which has value to the user of the module and which the user wishes to collect. Alternatively the target gas may be an undesirable gas, e.g. a pollutant or 'greenhouse gas', which the user wishes to separate from a gas stream in order to meet product specification or to protect the environment.

The modules are particularly useful for purifying natural gas (a mixture which predominantly comprises methane) by removing polar gases ($CO_2$, $H_2S$); for purifying synthesis gas; and for removing $CO_2$ from hydrogen and from flue gases. Flue gases typically arise from fireplaces, ovens, furnaces, boilers, combustion engines and power plants. The composition of flue gases depend on what is being burned, but usually they contain mostly nitrogen (typically more than two-thirds) derived from air, carbon dioxide ($CO_2$) derived from combustion and water vapour as well as oxygen. Flue gases also contain a small percentage of pollutants such as particulate matter, carbon monoxide, nitrogen oxides and sulphur oxides. Recently the separation and capture of $CO_2$ has attracted attention in relation to environmental issues (global warming).

The modules of the invention are particularly useful for separating the following: a feed gas comprising $CO_2$ and $N_2$ into a gas stream richer in $CO_2$ than the feed gas and a gas stream poorer in $CO_2$ than the feed gas; a feed gas comprising $CO_2$ and $CH_4$ into a gas stream richer in $CO_2$ than the feed gas and a gas stream poorer in $CO_2$ than the feed gas; a feed gas comprising $CO_2$ and $H_2$ into a gas stream richer in $CO_2$ than the feed gas and a gas stream poorer in $CO_2$ than the feed gas, a feed gas comprising H₂S and CH₄ into a gas stream richer in H₂S than the feed gas and a gas stream poorer in H₂S than the feed gas; and a feed gas comprising H₂S and H₂ into a gas stream richer in H₂S than the feed gas and a gas stream poorer in H₂S than the feed gas.

The invention will now be illustrated by the following, non-limiting examples.

EXAMPLES

The contact area, axial flux rate, compaction gas flux and selectivity described in the Examples were measured by the following techniques:

(A) Contact Area

In the Examples, the contact area was measured as follows:

A laminate was formed by sandwiching a square of the permeate carrier under test (5 cm×5 cm) inside a pouch formed from two A6 sheets of polyester/ethylene vinyl acetate (EVA) (each sheet had a thickness of 125 microns and the sheets were obtained from Staples) and feeding the pouch through a laminator (Ibico PL-330LSI) at 80° C. at motor speed 2. The polyester/EVA sheets were peeled off and contact areas of both the course (smooth) side and the wales (ribbed) side of the of the permeate carrier were measured using a Nikon SZM800 microscope using CellSens Dimension 1.6 digital imaging software version.

(B) Axial Flux Rate

Figure 4:
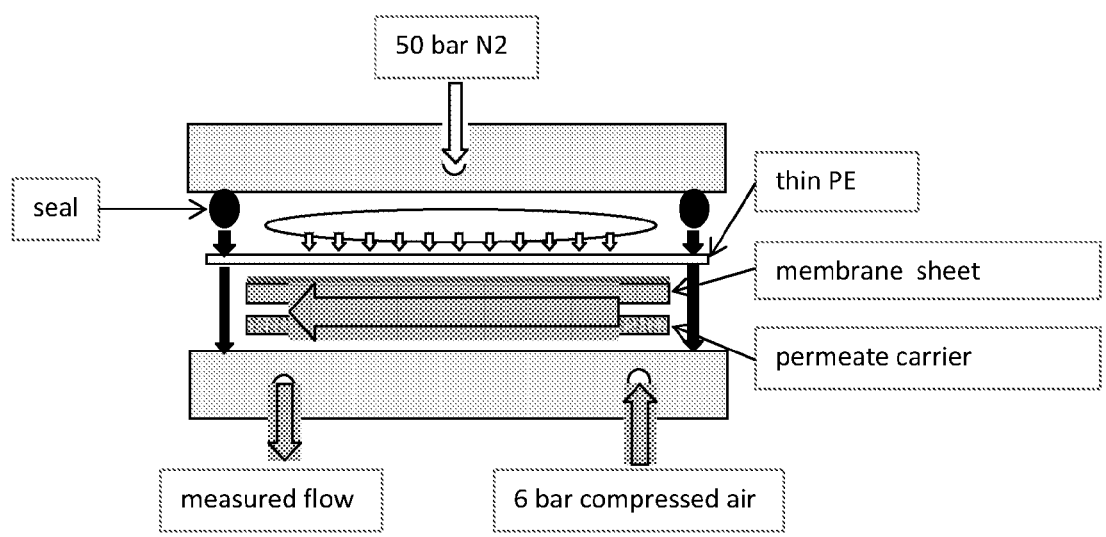
FIG. 4 illustrates a device used to measure the axial flux rate of a permeate carrier.

The axial flux rate (l/min) of the permeate carriers was determined using the device illustrated in FIG. 4. In FIG. 4, one can see the 50 bar of N₂ pressure being applied uniformly to the PE-interfoil which then uniformly compresses the membrane-permeate carrier laminate which is glued on two sides. Air was applied to the right (open) side of the permeate carrier at a pressure of 6 bar and the flow rate after 1 meter was measured to give the axial flux rate (l/min). Flux rates of at least 40 l/min are desirable under these conditions.

(C) Compaction

Compaction of the gas separation element was determined by measuring the % reduction in thickness of the element arising from compression for 5 hours at a pressure of 70 bar. Compaction was therefore given by the equation:

Compaction (%)=$(T_i-T_f)/T_i \times 100\%$ wherein:

$T_i$ is the initial thickness of the gas separation element; and $T_f$ is the thickness of the gas separation element after compression at 70 bar for 5 hours.

The thicknesses were measured using Zwick Z010 Materials Testing Machine. $T_f$ was measured while the compression force of 70 million Pascal was still being applied to the gas separation element.

(D) Evaluation of Gas Flux & Selectivity

The gas permeability and selectivity of the modules was determined as follows:

The flux of CH₄ and CO₂ through the module was measured at 40° C. and gas feed pressure of 6000 kPa using a pressure housing and a feed gas composition of 13 v/v % CO₂ and 87 v/v % CH₄. Flow, pressure, and gas composition of each feed gas, permeate gas, and retentate gas was measured and flux and selectivity was calculated according formulation described in "Calculation Methods for Multicomponent Gas Separation by Permeation" (Y. Shindo et al, Separation Science and Technology, Vol. 20, Iss. 5-6, 1985) with "countercurrent flow" mode. For flux calculation a module surface area of 29 m² was used, and flux unit GPU is equal to $7.5 \times 10^{-9}$ Nm³/m²·kPa·s.

The flux of O₂ and N₂ through the module was measured at 50° C. and gas feed pressure of 6000 kPa using a pressure housing and using compressed air as a feed gas. Flux and selectivity was calculated in the same calculation method as above.

Membranes

The following materials were used to prepare the Membranes 1 and 2:

PAN is a porous support polyacrylonitrile L10 ultrafiltration membrane from GMT Membrantechnik GmbH, Germany.

UV9300 is SilForce™ UV9300 from Momentive Performance Materials Holdings. This is thermally curable copolymer comprising at least 3 epoxy groups and linear polydimethyl siloxane chains. Furthermore, this copolymer cures rapidly when irradiated with UV light in the presence of a photo-initiator.

I0591 is 4-isopropyl-4'-methyldiphenyliodonium tetrakis (pentafluorophenyl) borate ($C_{40}H_{18}BF_{20}I$) from TCI (a photo-initiator which is free from mono-epoxy compounds).

Ti(OiPr)₄ is titanium (IV) isopropoxide from Dorf Ketal Chemicals.

n-Heptane is n-heptane from Brenntag Nederland BV.

MEK is 2-butanone from Brenntag Nederland BV.

CH is cyclohexanone from Brenntag Nederland BV.

PI is poly([({2,3,5,6-tetramethyl-1,4-phenylenediamine}-alt-{5,5'-[2,2,2-trifluoro-1-(trifluoromethyl)ethane-1,1-diyl]bis(isobenzofuran-1,3-dione)})-co-[{5-carboxylic-1,3-phenylenediamine}-alt-{5 trifluoro-1-(trifluoromethyl) ethane-1,1-diyl]bis(isobenzofuran-1,3-dione)}]) obtained from Fujifilm Corporation.

CA is cellulose acetate L-70 from Daicel Chemical Industries Ltd.

PE Interfoil is a 50 µm thick gas-Impermeable polyester sheet sold under the name Mylar A50, obtained from Dupont.

PET means polyethylene terephthalate.

Preparation of Membrane Sheets 1 and 2 (M1 and M2)

Stage a) Preparation of a Partially Cured Polymer 1 ("PCP Polymer 1")

A solution of a PCP Polymer 1 was prepared by heating the components described in Table 1 together for 105 hours at 95° C. The resultant solution of PCP Polymer 1 had a viscosity of about 64,300 mPas when measured at 25° C.

TABLE 1

| Ingredients used to prepare PCP Polymer 1 | |
|---|---|
| Ingredient | Amount (w/w %) |
| UV9300 | 75 |
| Ti(OiPr)₄ | 1.5 |
| n-Heptane | 23.5 |

Stage b) Preparation of Radiation Curable Composition 1 ("RCC1")

Portions of the solution of PCP Polymer 1 obtained in stage a) above were cooled to 20° C., diluted with n-heptane and then filtered through a filter paper having an average pore size of 2.7 µm. The remaining ingredients indicated in Table 2 below were added to make RCC1 to 5 as indicated in Table 2 below.

TABLE 2

|  |  | RCC1 |
|---|---|---|
| Inert solvent | n-Heptane (w/w %) | 84.9 |
|  | MEK (w/w %) | 1.6 |
| PCP Polymer | PCP Polymer 1 (w/w %) | 13.3 |
| Photo-initiator | I0591 (w/w %) | 0.2 |

Stage c) Preparation of Compositions Used to Form a Discriminating Layer

Compositions DSL1 and DSL2 were prepared by mixing the components shown in Table 3 and filtering the mixtures through a filter paper having an average pore size of 2.7 μm.

TABLE 3

|  | DSL1 | DSL2 |
|---|---|---|
| PI (w/w %) | 2.00 | 0 |
| CA (w/w %) | 0 | 1.3 |
| CH (w/w %) | 6.00 | 94.77 |
| MEK (w/w %) | 92.00 | 3.8 |
| I0591 (w/w %) | 0 | 0.13 |

Stage d) Preparation of Membrane Sheets

Membrane sheets were prepared using the combinations of radiation-curable composition and discriminating layers described in Table 4.

The radiation-curable composition RCC1 was applied to a porous PAN substrate (step a)) at a speed of 10 m/min by a meniscus dip coating and irradiated. Irradiation (step b)) was performed using a Light Hammer LH10 from Fusion UV Systems fitted with a D-bulb and irradiating with an intensity of 16.8 kW/m (70%). The resultant gutter layer had a dry thickness of 300 nm. The discriminating layer was formed on the gutter layer using the composition DSL1 as indicated in Table 4, using a meniscus type coating T 10 m/min coating speed. In Example 1, the discriminating layer comprised PI. In Example 2, the discriminating layer comprised cellulose acetate. The resultant membrane sheets were dried and tested in isolation (i.e. in the absence of the permeate carrier). The test results are shown in Table 4 below.

TABLE 4

| Example | Membrane Sheet 1 ("M1") | Membrane Sheet 2 ("M2") |
|---|---|---|
| Radiation-curable Composition | RCC1 | RCC1 |
| Coating speed (m/min) | 10 | 10 |
| Coating amount (ml/m²) | 3 | 3 |
| Dry layer thickness of gutter layer (nm) | 300 | 300 |
| Discriminating layer composition | DSL1 | DSL2 |
| Coating amount (ml/m²) | 8.4 | 8.4 |
| Dry layer thickness of discriminating layer (nm) | 120 | 120 |

Permeate Carriers

The macroporous sheets used in the Examples to form the permeate carriers were obtained from the suppliers indicated in Table 5 below:

TABLE 5

| Macroporous Sheets | | | | | | |
|---|---|---|---|---|---|---|
| Macroporous Sheets | Abbreviation | Supplier | Description | Average thickness (mm) | wpi | cpi |
| HW 2503 | MPS1 | Hornwood Inc. | A fabric made from PET and epoxy resin 75:25. | 0.3 | 46 | 44 |
| GF 42369 | MPS2 | Guilford | A fabric made from PET and epoxy resin 80:20. | 0.3 | 62 | 57 |
| GF 36168 | MPS3 | Guilford | A fabric made from PET and epoxy resin 75:25. | 0.3 | 45 | 46 |
| S 2866-2 | MPS4 | Seiren | A fabric made from PET | 0.23 | 45 | 46 |

Wpi means wales per 2.54 cm (inch) and cpi means courses per 2.5 cm (inch).

Preparation of Gas Separation Elements Ex1-Ex4 and CEx1-CEx3 (No Central, Gas Impermeable Sheet)

Gas separation elements were prepared as follows:

Permeate carriers comprising two macroporous sheets were prepared by gluing three of the four edges of the macroporous sheets together, leaving one edge free to feed permeate into a central tube (fitted later). All four edges of both sides of the resultant permeate carriers were then glued to the membrane sheets to give a gas separation element comprising a permeate carrier (comprising two macroporous sheets) and having membranes sheets attached as the outermost layers, with no central gas-impermeable sheet, as illustrated schematically below:

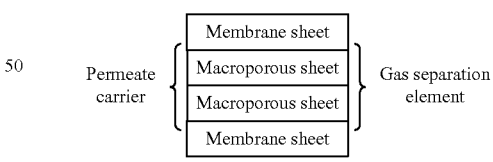

The contact area, axial flux rate and compaction of the resultant gas separation elements were measured by the methods described above and the results are also shown in Table 6 below.

Preparation of Gas Separation Element Ex5 (Includes a Central, Gas Impermeable Sheet)

Gas separation element Ex5 was prepared in an analogous manner to Ex1-Ex4 and CEx1-CEx3 except that a gas impermeable sheet (PE interfoil) was included between the macroporous sheets (see illustration below), as illustrated schematically below:

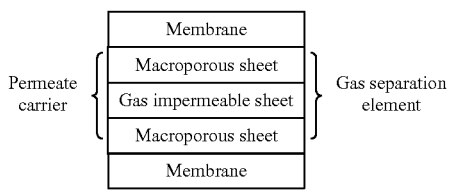

The contact area, axial flux rate and compaction of the resultant gas separation elements were measured by the methods described above and the results are also shown in Table 6:

TABLE 6

Gas Separation Elements

| Example | Gas separation element Layers | Gas impermeable sheet present? | Macroporous Sheet Orientation (i.e. which side faces the membrane) | Contact Area (%) | Axial Flux Rate (l/min) |
|---|---|---|---|---|---|
| Ex1 | M1/MPS1/MPS1/M1 | No | Course | 42.4 | 61 |
| Ex2 | M2/MPS1/MPS1/M2 | No | Course | 42.4 | 58 |
| Ex3 | M1/MPS3/MPS3/M1 | No | Course | 43.0 | 47 |
| Ex4 | M1/MPS4/MPS4/M1 | No | Course | 48.0 | 41 |
| Ex5 | M1/MPS1/PE/MPS1/M1 | Yes | Course | 42.4 | 65 |
| CEx1 | M1/MPS1/MPS1/M1 | No | Wales | 54.2 | 39 |
| CEx2 | M1/MPS2/MPS2/M1 | No | Course | 55.4 | 34 |
| CEx3 | M1/MPS2/MPS2/M1 | No | Wales | 71.8 | 28 |

As can be seen from Table 6, the axial flux rate was better when the contact area of the membrane sheets with the permeate carrier was less than 50%.

Preparation of Modules

The gas separation elements from Ex 1 and Ex5 were wound onto a perforated tube of diameter 5 cm together with feed spacer screens to allow the influx of feed gases to the side of the membranes opposite to the permeate carrier. The non-glued edges were fixed to the tube such that gas which permeates through the membrane sheets could flow through the permeate carrier and into the central tube but gas which did not permeate through the membrane sheets could not enter the central tube. The resultant structure was encased in fibreglass and anti-telescoping devices were glued to each corner cylinder side to give gas separation modules. The modules were then cased in a steel housing and tested for gas flux and selectivity by the above described methods, providing the results shown in Table 7 below:

TABLE 7

Gas Separation Modules containing the gas Seperation Elements ("GSE"s)

| | GSE | Gas impermeable sheet present? | Module $\alpha CO_2/CH_4$ separation (sel/flux)* | Module $\alpha O_2/N_2$ separation (sel/flux)* | Compaction (%) |
|---|---|---|---|---|---|
| Module 1 | Ex1 | No | 14/20 | 4.65/9.3 | 23 |
| Module 2 | Ex2 | Yes | 15/50 | 4.99/11.4 | 22 |

*sel means selectivity ($\alpha$) and flux is in GPU units

As can be seen from Table 7, inclusion of a gas impermeable sheet (Module 2) resulted in improved selectivity and gas flux compared to Module 1 lacking the gas impermeable sheet.

The invention claimed is:

1. A gas separation module comprising one or more gas separation elements, said elements comprising at least two membrane sheets and a permeate carrier sandwiched between the membrane sheets, wherein the contact area of the membrane sheets with the permeate carrier is less than 50%, wherein:
   (i) the permeate carrier comprises at least two macroporous layers and a gas impermeable sheet located between the two macroporous layers; and
   (ii) the contact area is as determined before use by forming a membrane sheet—permeate carrier laminate using a laminator, peeling off the membrane sheets and determining the contact area by performing measurements using a microscope.

2. The gas separation module according to claim 1 wherein the contact area is less than 45%.

3. The gas separation module according to claim 1 being a spiral wound gas separation module.

4. The gas separation module according to claim 1 wherein the membrane sheets and/or the permeate carrier have a surface profile which causes the contact area of claim 1.

5. The gas separation module according to claim 1 wherein the membrane sheets and/or the permeate carrier have a surface profile comprising surface projections.

6. The gas separation module according to claim 5 wherein the surface projections comprise ribs and/or grooves.

7. The gas separation module according to claim 1 wherein the permeate carrier comprises a knitted fabric.

8. The gas separation module according to claim 1 wherein the gas impermeable sheet has a thickness of less than 0.1 cm.

9. The gas separation module according to claim 1 wherein at least one of the gas separation elements reduces in thickness by <25% when it is subjected to a pressure of 7 million Pascal for 5 hours.

10. The gas separation module according to claim 1 which further comprises a central tube and the one or more gas separation elements are wound around that tube and are in gas communication therewith.

11. The gas separation module according to claim 1 wherein the gas separation elements are fixed to the central tube such that gas which permeates through the membrane sheets can flow through the permeate carrier and into the central tube but gas which does not permeate through the membrane sheets cannot enter the central tube.

12. The gas separation module according to claim 1 which comprises two or more gas separation elements and a feed spacer screen located between the gas separation elements.

13. A process for separating gases and/or purifying a feed gas comprising at least two different gaseous components comprising passing the feed gas through a module according to claim 1 such that feed gas is separated into a permeate gas and a retentate gas, one of which is enriched in at least one of the said gaseous components and one of which is depleted in at least one of the said gaseous components.

14. The gas separation module according to claim 1 wherein the membrane sheets and/or the permeate carrier have a surface profile comprising surface projections which causes the contact area of the membrane sheets with the permeate carrier to be than 45%.

15. The gas separation module according to claim 14 being a spiral wound gas separation module.

16. The gas separation module according to claim 1 wherein (i) the permeate carrier comprises at least two macroporous layers and a gas impermeable sheet located between the two macroporous layers; (ii) the gas separation elements are fixed to a central tube such that gas which permeates through the membrane sheets can flow through the permeate carrier and into the central tube but gas which does not permeate through the membrane sheets cannot enter the central tube; and (iii) the membrane sheets and/or the permeate carrier have a surface profile comprising surface projections which cause the contact area of the membrane sheets with the permeate carrier to be less than 45%.

17. The gas separation module according to claim 16 wherein the gas impermeable sheet has a thickness of less than 0.1 cm.

18. A process for separating gases and/or purifying a feed gas comprising at least two different gaseous components comprising passing the feed gas through a module according to claim 16 such that feed gas is separated into a permeate gas and a retentate gas, one of which is enriched in at least one of the said gaseous components and one of which is depleted in at least one of the said gaseous components.

\* \* \* \* \*